US012044994B2

(12) United States Patent
Miyashita

(10) Patent No.: US 12,044,994 B2
(45) Date of Patent: Jul. 23, 2024

(54) FIXING DEVICE

(71) Applicant: TOSHIBA TEC KABUSHIKI KAISHA, Tokyo (JP)

(72) Inventor: Kousei Miyashita, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/948,693

(22) Filed: Sep. 20, 2022

(65) Prior Publication Data

US 2023/0067291 A1 Mar. 2, 2023

Related U.S. Application Data

(62) Division of application No. 17/411,419, filed on Aug. 25, 2021.

(51) Int. Cl.
*G03G 15/20* (2006.01)

(52) U.S. Cl.
CPC ..... *G03G 15/2053* (2013.01); *G03G 15/2042* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

| | | | | |
|---|---|---|---|---|
| 10,281,857 | B1 * | 5/2019 | Aikawa | G03G 15/2064 |
| 2005/0169659 | A1 * | 8/2005 | Koyama | G03G 15/5004 399/88 |
| 2014/0138372 | A1 | 5/2014 | Ogura | |
| 2014/0294458 | A1 * | 10/2014 | Jeon | G03G 15/2053 399/329 |

(Continued)

FOREIGN PATENT DOCUMENTS

| | | |
|---|---|---|
| JP | 2014-126773 A | 7/2014 |
| JP | 2016-188916 A | 11/2016 |
| JP | 2017-167462 A | 9/2017 |

OTHER PUBLICATIONS

Notice of Allowance on U.S. Appl. No. 17/411,419 DTD Nov. 23, 2022.

(Continued)

*Primary Examiner* — Thomas S Giampaolo, II
(74) *Attorney, Agent, or Firm* — FOLEY & LARDNER LLP

(57) ABSTRACT

A fixing device includes a cylinder, a heater, a contact body, and a soaking member. The heater has a first surface and an opposing second surface. The heater includes a heating element extending along a longitudinal direction of the heater. The first surface engages with an inner surface of the cylinder. The contact body is configured to engage with the inner surface of the cylinder. The contact body is configured to be heated at a first position along the longitudinal direction at a first temperature increase rate and at a second (Continued)

position along the longitudinal direction at a second temperature increase rate that is lower than the first temperature increase rate. The soaking member is positioned to engage with the opposing second surface of the heater. The soaking member has a second thermal capacity lower than a first thermal capacity at the respective second and first positions.

19 Claims, 13 Drawing Sheets

(56) References Cited

U.S. PATENT DOCUMENTS

| | | | | |
|---|---|---|---|---|
| 2017/0219969 | A1 | 8/2017 | Umeda et al. | |
| 2018/0364623 | A1* | 12/2018 | Okanemasa ....... | G03G 15/2039 |
| 2020/0257225 | A1* | 8/2020 | Kikuchi ............. | G03G 15/2064 |
| 2021/0063928 | A1* | 3/2021 | Uehara .............. | G03G 15/2053 |

OTHER PUBLICATIONS

Non-Final Office Action on U.S. Appl. No. 17/411,419 DTD Jul. 20, 2022.

* cited by examiner

FIXING DEVICE

CROSS-REFERENCE TO RELATED PATENT APPLICATION

This application is a divisional of U.S. patent application Ser. No. 17/411,419, filed Aug. 25, 2021, which is incorporated herein by reference in its entirety.

FIELD

Embodiments described herein relate generally to a fixing device.

BACKGROUND

An image forming apparatus that forms an image on a sheet is used. The image forming apparatus includes a fixing device that heats toner (recording agent) to fix the toner to a sheet. Temperature unevenness of the fixing device may cause unevenness in gloss in an image formed on the sheet.

DETAILED DESCRIPTION

Figure 1:
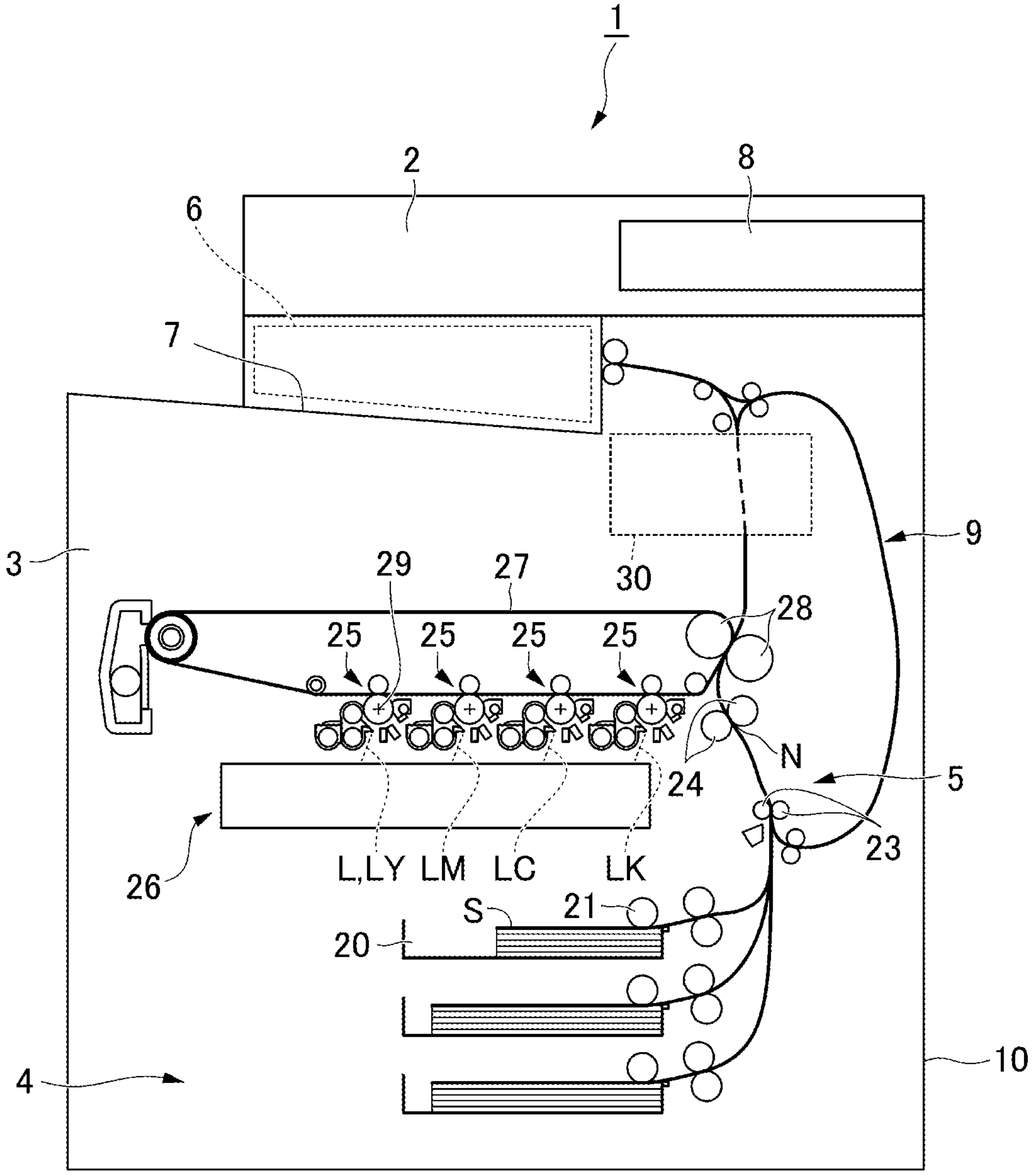
FIG. 1 is a diagram illustrating a schematic configuration of an image forming apparatus according to an embodiment.

In general, according to at least one embodiment, a fixing device includes a cylinder, a heater unit, a contact body, and a soaking member. The cylinder is configured to come into contact with a sheet and to rotate, the sheet moving in a first direction. The heater unit includes a heat generation unit in which a longitudinal direction is a second direction perpendicular to the first direction. The heater unit has a first surface and a second surface facing a side opposite to the first surface. The first surface of the heater unit comes into contact with an inner surface of the cylinder. The contact body is configured to come into contact with the cylinder. If the heater unit heats the cylinder, the contact body is configured to be heated at a first position in the second direction at a first temperature increase rate. If the heater unit heats the cylinder, the contact body is configured to be heated at a second position in the second direction at a second temperature increase rate that is lower than the first temperature increase rate. The soaking member is configured to come into contact with the second surface of the heater unit. A thermal capacity of the soaking member per unit length at the second position in the second direction is lower than a thermal capacity of the soaking member per unit length at the first position in the second direction.

Hereinafter, a fixing device according to an embodiment will be described with reference to the drawings. In the following description, components having the same or similar functions will be represented by the same reference numerals, and repeated description thereof will not be repeated.

FIG. 1 is a diagram illustrating a schematic configuration of an image forming apparatus according to at least one embodiment. As illustrated in FIG. 1, an image forming apparatus 1 executes a process of forming an image on a sheet S. The sheet S may be paper. The image forming apparatus 1 includes a housing 10, a scanner unit 2 (a scanner), an image forming unit 3 (a printer), a sheet supply unit 4, a conveying unit 5 (a conveyor), a paper discharge tray 7, an inversion unit 9 (an inversion conveyor assembly), a control panel 8, and a control unit 6 (a controller).

The housing 10 forms an external shape of the image forming apparatus 1. The scanner unit 2 reads image information of a copying object based on brightness and darkness of light and generates an image signal. The scanner unit 2 outputs the generated image signal to the image forming unit 3. The image forming unit 3 forms a toner image with a recording agent such as toner based on the image signal received from the scanner unit 2 or an image signal received from an external apparatus. The image forming unit 3 transfers the toner image to a surface of the sheet S. The image forming unit 3 applies heat and pressure to the toner image on the surface of the sheet S such that the toner image is fixed to the sheet S. The details of the image forming unit 3 will be described below.

The sheet supply unit 4 supplies the sheet S to the conveying unit 5 one by one at a timing at which the image forming unit 3 forms the toner image. The sheet supply unit 4 includes a sheet accommodation unit 20 (a sheet tray) and a pickup roller 21. The sheet accommodation unit 20 accommodates the sheet S having a predetermined size and a predetermined type. The pickup roller 21 picks up the sheet S from the sheet accommodation unit 20 one by one. The pickup roller 21 supplies the picked sheet S to the conveying unit 5.

The conveying unit 5 conveys the sheet S supplied from the sheet supply unit 4 to the image forming unit 3. The conveying unit 5 includes a conveying roller 23 and a registration roller 24. The conveying roller 23 conveys the sheet S supplied from the pickup roller 21 to the registration roller 24. The conveying roller 23 allows a tip of the sheet S in a conveying direction to abut against a nip N of the registration roller 24. The registration roller 24 aligns a position of the tip of the sheet S in the conveying direction by bending the sheet S in the nip N. The registration roller 24 conveys the sheet S at a timing at which the image forming unit 3 transfers the toner image to the sheet S.

The image forming unit 3 will be described. The image forming unit 3 includes a plurality of image forming units 25, a laser scanning unit 26, an intermediate transfer belt 27, a transfer unit 28, and a fixing device 30. The image forming unit 25 includes a photoconductive drum 29. The image forming unit 25 forms the toner image on the photoconductive drum 29 based on the image signal received from the scanner unit 2 or an external apparatus. A plurality of image forming units 25 form toner images with yellow, magenta, cyan, and black toners, respectively.

A charging unit, a developing unit, and the like are disposed around the photoconductive drum 29. The charging unit charges a surface of the photoconductive drum 29. The developing unit contains a developer including the yellow, magenta, cyan, and black toners. The developing unit develops an electrostatic latent image on the photoconductive drum 29. As a result, the toner image is formed on the photoconductive drum 29 by each of the respective color toners.

The laser scanning unit 26 deflects laser light L for scanning the charged photoconductive drum 29 such that the photoconductive drum 29 is exposed. The laser scanning unit 26 exposes the photoconductive drums 29 of the image forming units 25 of the respective colors to laser light components LY, LM, LC, and LK, respectively. As a result, the laser scanning unit 26 forms the electrostatic latent image on the photoconductive drum 29.

The toner image on the surface of the photoconductive drum 29 is primarily transferred to the intermediate transfer belt 27. The transfer unit 28 transfers the toner image primarily transferred to the intermediate transfer belt 27 to the surface of the sheet S at a secondary transfer position. The fixing device 30 applies heat and pressure to the toner image transferred to the sheet S such that the toner image is fixed to the sheet S. The details of the fixing device 30 will be described below.

The inversion unit 9 inverts the sheet S for forming an image on a back surface of the sheet S. The inversion unit 9 switches back the sheet S discharged from the fixing device 30 to invert front and back surfaces of the sheet S. The inversion unit 9 conveys the inverted sheet S to the registration roller 24. The paper discharge tray 7 places the discharged sheet S on which the image is formed. The control panel 8 is a part of an input unit that inputs information for allowing an operator to operate the image forming apparatus 1. The control panel 8 includes a touch panel and/or various hard keys. The control unit 6 controls the respective units of the image forming apparatus 1.

Figure 2:
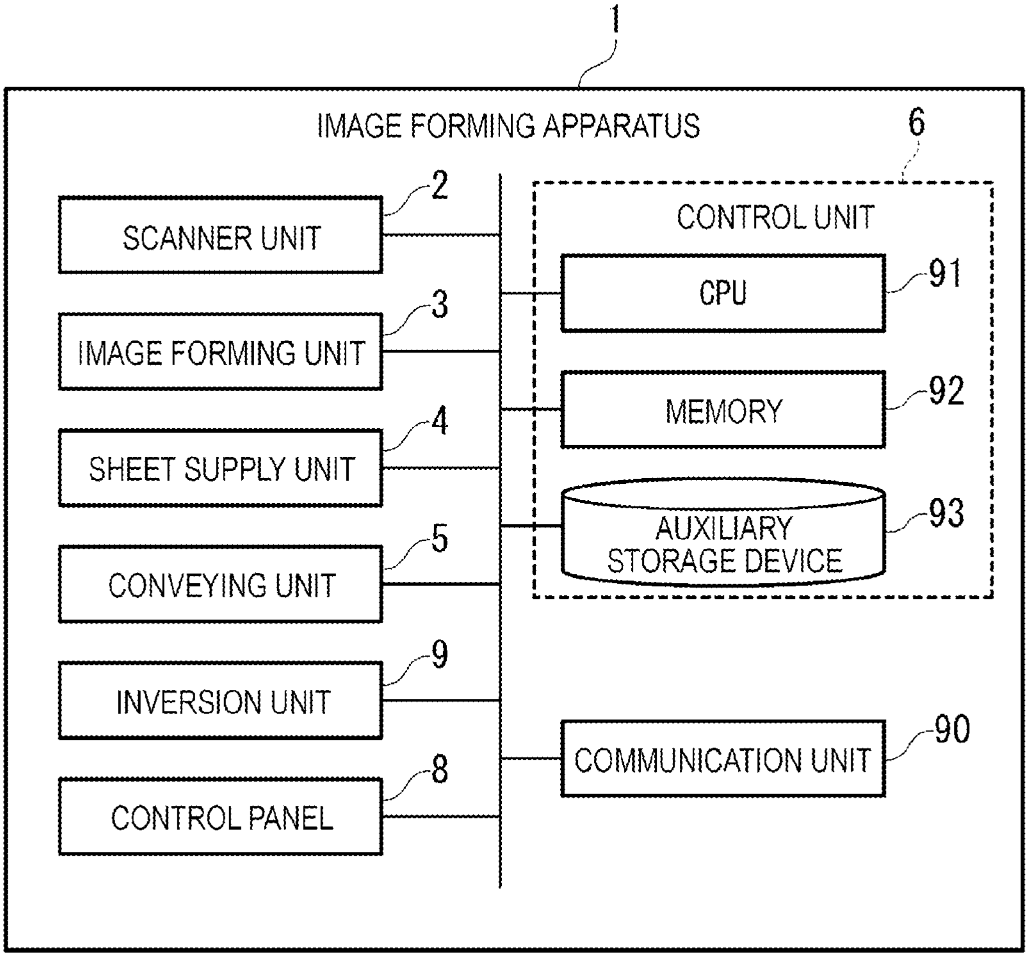
FIG. 2 is a diagram illustrating a hardware configuration of the image forming apparatus.

FIG. 2 is a diagram illustrating a hardware configuration of the image forming apparatus according to at least one embodiment. As illustrated in FIG. 2, the control unit 6 of the image forming apparatus 1 includes a central processing unit (CPU) 91, a memory 92, and an auxiliary storage device 93 connected through a bus and executes a program. By executing the program, the image forming apparatus 1 functions as an apparatus including the scanner unit 2, the image forming unit 3, the sheet supply unit 4, the conveying unit 5, the inversion unit 9, the control panel 8, and a communication unit 90.

The CPU 91 functions as the control unit 6 by executing a program stored in the memory 92 and the auxiliary storage device 93. The control unit 6 controls operations of the respective functional units of the image forming apparatus 1. The auxiliary storage device 93 is configured using a storage device such as a magnetic hard disk device or a semiconductor memory device. The auxiliary storage device 93 stores information. The communication unit 90 includes a communication interface for connecting the image forming apparatus to an external apparatus. The communication unit 90 communicates with the external apparatus via the communication interface.

Figure 3:
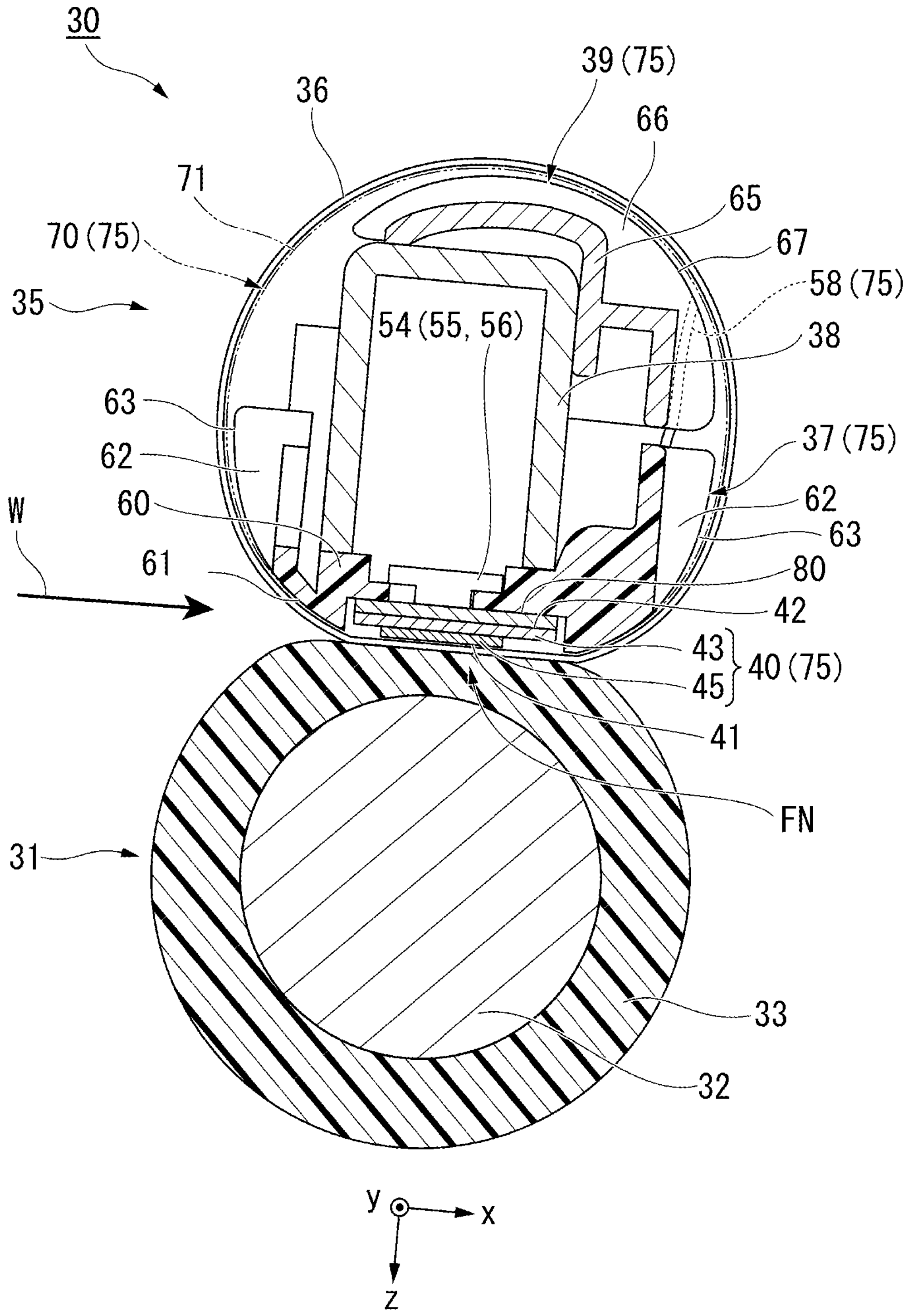
FIG. 3 is a front cross-sectional view illustrating a fixing device.

A basic configuration of the fixing device 30 will be described. FIG. 3 is a front cross-sectional view illustrating the fixing device 30 according to at least one embodiment. As illustrated in FIG. 3, the fixing device 30 includes a pressurization roller 31 and a film unit 35. A fixing nip FN is formed between the pressurization roller 31 and the film unit 35. The pressurization roller 31 pressurizes the toner image of the sheet S in the fixing nip FN. The pressurization roller 31 rotates and conveys the sheet S. The film unit 35 heats the toner image of the sheet S in the fixing nip FN.

In the present application, an x direction, a y direction, and a z direction are defined as follows. The z direction is a direction in which the pressurization roller 31 and the film unit 35 are disposed. A +z direction is a direction from the film unit 35 to the pressurization roller 31. The x direction (first direction) is a conveying direction of the sheet S in the fixing nip FN, and a +x direction is the downstream side of the conveying direction of the sheet S. The y direction (second direction) is a direction perpendicular to the z direction and the x direction and is an axial direction of the pressurization roller 31.

The pressurization roller 31 includes a core 32, an elastic layer 33, and a release layer. The core 32 is formed of a metal material such as stainless steel in a cylindrical shape. Both end portions of the core 32 in an axial direction are rotatable and supported. The core 32 is rotated by a motor. The core 32 abuts against a cam member. The cam member rotates to move the core 32 close to or away from the film unit 35.

The elastic layer 33 is formed of an elastic material such as a silicone rubber. The elastic layer 33 is formed on an outer circumferential surface of the core 32 at a given thickness. The release layer (not illustrated) is formed of a resin material such as a tetrafluoroethylene-perfluoroalkyl vinyl ether copolymer (PFA). The release layer is formed on an outer circumferential surface of the elastic layer 33. It is desirable that the hardness of the outer circumferential surface of the pressurization roller 31 is 40° to 70° when measured with an ASKER-C hardness tester under a load of 9.8 N. As a result, the area of the fixing nip FN and the durability of the pressurization roller 31 are secured.

The pressurization roller 31 can move toward and away from the film unit 35 together with the rotation of the cam member. If the pressurization roller 31 moves close to the film unit 35 and is pressed by a pressurization spring, the fixing nip FN is formed. On the other hand, if the sheet S is jammed in the fixing device 30, the sheet S can be removed by moving the pressurization roller 31 away from the film unit 35. By moving the pressurization roller 31 away from the film unit 35 in a state where the rotation of a cylindrical film 36 is stopped, for example, during sleep, the plastic deformation of the cylindrical film 36 is prevented.

The pressurization roller 31 is rotated by a motor. If the pressurization roller 31 rotates in a state where the fixing nip FN is formed, the cylindrical film 36 of the film unit 35 is rotated. If the pressurization roller 31 rotates in a state where the sheet S is disposed in the fixing nip FN, the pressurization roller 31 conveys the sheet S in a conveying direction W.

Figure 4:
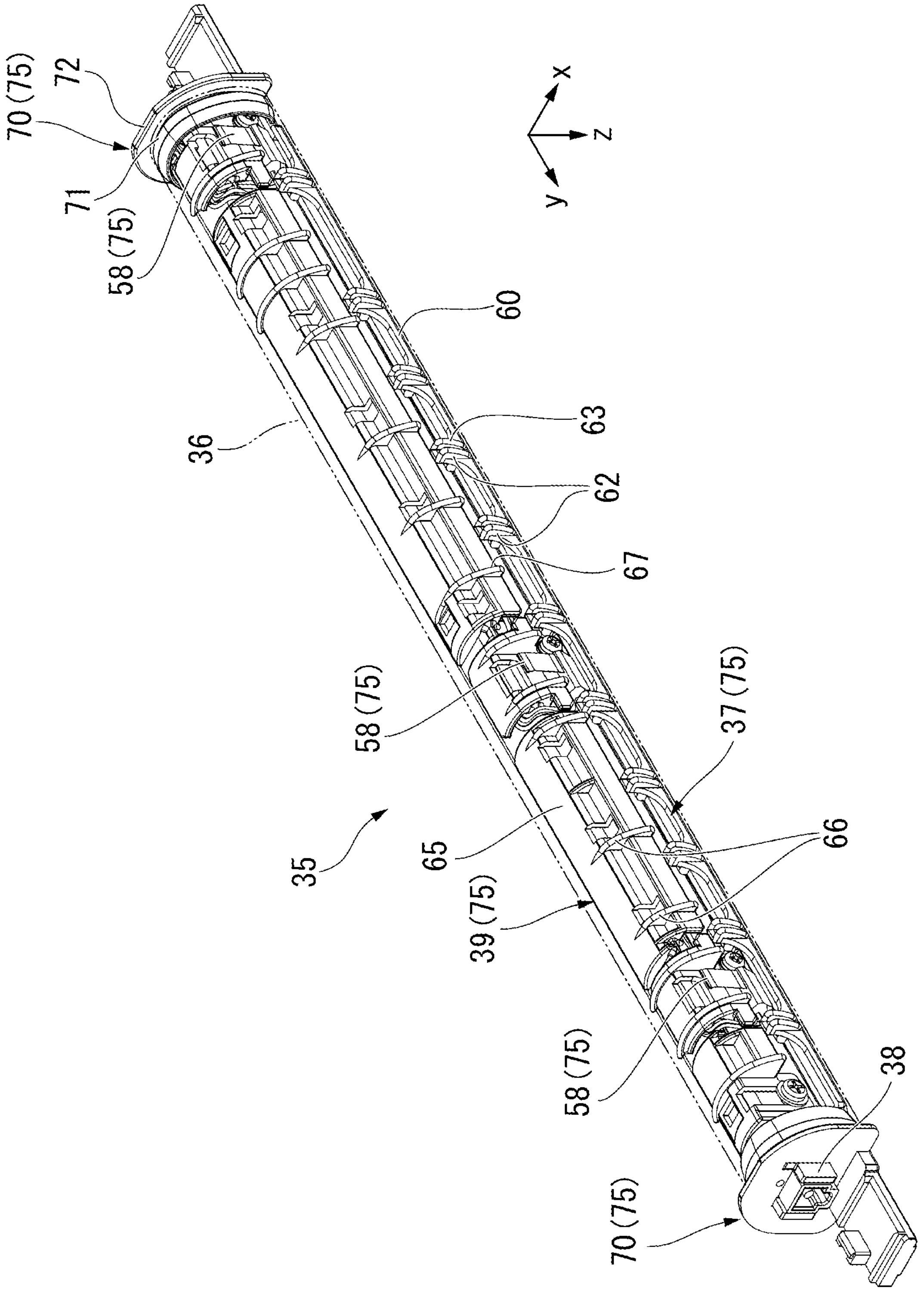
FIG. 4 is a perspective view illustrating a film unit.

FIG. 4 is a perspective view illustrating the film unit 35 according to at least one embodiment. As illustrated in FIGS. 3 and 4, the film unit 35 includes the cylindrical film (cylinder) 36, a heater unit 40 (a heater, a heating assembly, etc.), a soaking member 80 (a thermal capacitor, a heat sink, etc.), a support member 37, a stay 38, a guide member 39, stoppers 70, thermosensitive elements 54, and a film thermometer 58.

The cylindrical film 36 is a fixing belt. The cylindrical film 36 is formed in a cylindrical shape extending in the y direction. The cylindrical film 36 includes a base layer, an elastic layer, and a release layer in order from the inner circumferential side. The base layer is formed of a material such as polyimide in a cylindrical shape. The elastic layer is laminated on an outer circumferential surface of the base layer. The elastic layer is formed of an elastic material such as a silicone rubber. The release layer is laminated on an outer circumferential surface of the elastic layer. The release layer is formed of a material such as PFA resin.

The heater unit 40 is present inside the cylindrical film 36. The heater unit 40 is formed in a rectangular plate shape in which the longitudinal direction is the y direction and the transverse direction is the x direction. In the x direction and the y direction, a direction toward the center of the heater unit 40 will also be referred to as "inner side", and a direction away from the center of the heater unit 40 will also be referred to as "outer side". The heater unit 40 includes a first surface 41 in the +z direction and a second surface 42 facing a side opposite to the first surface 41. The first surface 41 of the heater unit 40 comes into contact with an inner surface of the cylindrical film 36 through a grease.

Figure 5:
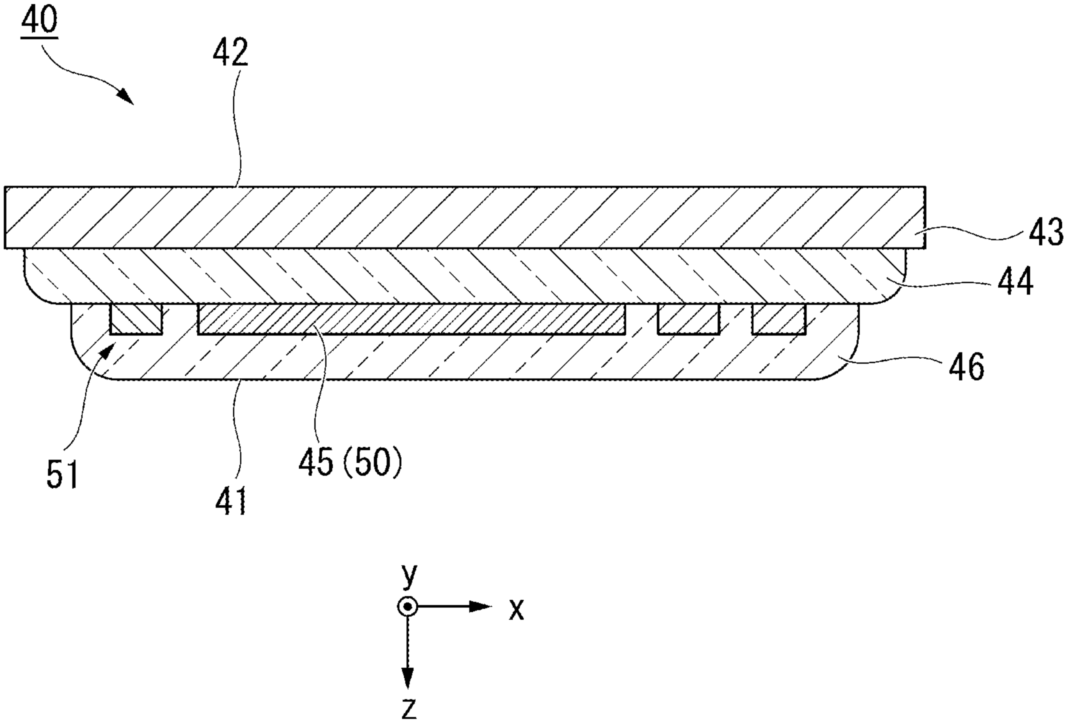
FIG. 5 is a front cross-sectional view illustrating a heater unit taken along line V-V of FIG. 6.
Figure 6:
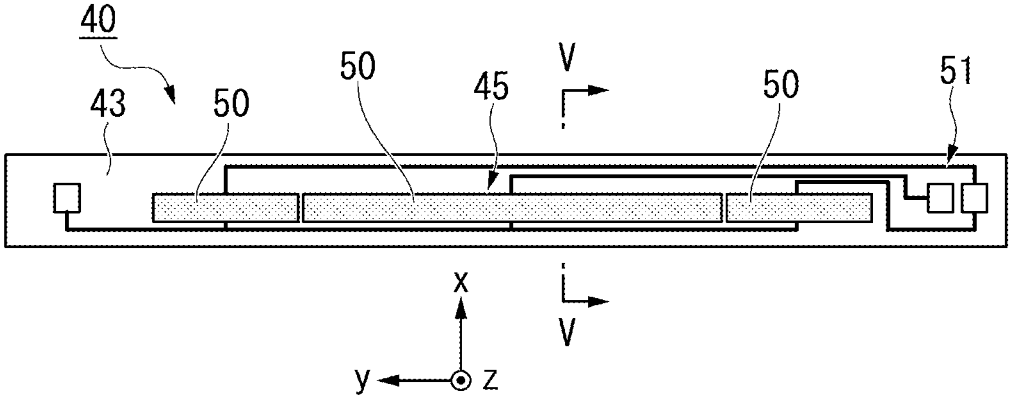
FIG. 6 is a bottom view illustrating the heater unit.

FIG. 5 is a front cross-sectional view illustrating the heater unit 40 taken along line V-V of FIG. 6. FIG. 6 is a bottom view (view when seen from the +Z direction) illustrating the heater unit 40. As illustrated in FIGS. 5 and 6, the heater unit 40 includes a substrate 43, a heat generation unit 45 (a heating element, a heater, etc.), and a wiring set 51.

The substrate 43 is formed of, for example, a metal material such as stainless steel or a ceramic material such as aluminum nitride. The substrate 43 is formed in a rectangular plate shape in which the longitudinal direction is the y direction and the transverse direction is the x direction. An insulating layer 44 is formed of a glass material or the like on a surface of the substrate 43 in the +z direction. A surface of the substrate 43 in the −z direction is a second surface 42 of the heater unit 40. The second surface 42 of the heater unit 40 is formed in a planar shape perpendicular to the z direction.

As illustrated in FIG. 6, the heat generation unit 45 is disposed in the substrate 43. The external shape of the entire heat generation unit 45 is formed in a rectangular shape in which the longitudinal direction is the y direction and the transverse direction is the x direction. The entirety of the heat generation unit 45 is in the region of the fixing nip FN and is disposed at the center of the fixing nip FN (refer to FIG. 3).

The heat generation unit 45 includes at least one heating element 50. In the example shown in the drawing, the heat generation unit 45 includes a plurality of heating elements 50. The heating element 50 is formed by disposing a material such as a silver-palladium alloy on the substrate 43 by screen printing. The heating elements 50 are disposed at intervals in the y direction. The heating elements 50 are disposed in line in they direction. A wiring of the wiring set 51 is connected to each of the heating elements 50.

The heat generation unit 45 generates heat by being energized through the wiring set 51. The sheet S having a small width in the y direction passes through the center portion of the fixing device 30 in the y direction. Here, the control unit 6 causes only a part of the heating elements 50 positioned on the inner side among the heating elements 50 to generate heat. On the other hand, in the case of the sheet S having a large width in the y direction, the control unit 6 causes all the heating elements 50 to generate heat.

As illustrated in FIG. 5, the heat generation unit 45 and the wiring set 51 are formed on a surface of the insulating layer 44 in the +z direction. A protective layer 46 is formed of a glass material or the like to cover the heat generation unit 45 and the wiring set 51. The protective layer 46 forms the first surface 41 of the heater unit 40. If the heater unit 40 generates heat, the viscosity of the grease between the protective layer 46 and the cylindrical film 36 decreases. Therefore, the sliding properties between the heater unit 40 and the cylindrical film 36 are secured.

As in the insulating layer 44 that is formed on the substrate 43 in the +z direction, an insulating layer may be formed on the substrate 43 in the −z direction. As in the protective layer 46 that is formed on the substrate 43 in the +z direction, a protective layer may be formed on the substrate 43 in the −z direction. As a result, the warping of the substrate 43 is reduced.

As illustrated in FIG. 3, the soaking member 80 is formed of a metal material having high thermal conductivity such as copper or aluminum, a graphite sheet, or the like. The soaking member 80 is a single member. The soaking member 80 is formed in a rectangular plate shape having substantially the same size as the substrate 43 of the heater unit 40 in the x direction and the y direction. The soaking member 80 overlaps the heater unit 40. The soaking member 80 comes into contact with and disposed in at least a part of the second surface 42 of the heater unit 40.

As illustrated in FIGS. 3 and 4, the support member 37 is formed of a resin material such as a liquid crystal polymer. The support member 37 is disposed opposite to the heater unit 40 with respect to the soaking member 80. The support member 37 includes a base portion 60 and sliding ribs 62.

The base portion 60 is disposed to cover both sides of the heater unit 40 and the soaking member 80 in the −z direction and the x direction. The base portion 60 supports the heater unit 40 through the soaking member 80. The base portion 60 includes guide surfaces 61. The guide surfaces 61 slide on an inner circumferential surface of the cylindrical film 36. The guide surfaces 61 are present on both end portions of the base portion 60 in the x direction. The guide surfaces 61 are present on both sides in the x direction relative to the heater unit 40. The guide surfaces 61 are formed in a curved shape in a circumferential direction of the cylindrical film 36. The guide surfaces 61 are continuous in the y direction. The guide surfaces 61 are provided such that the heat generation unit 45 of the heater unit 40 is interposed therebetween over the entire length in the y direction.

The sliding ribs 62 protrude from the base portion 60 outward in the x direction and in −z direction. Each of the sliding ribs 62 has a thickness in the y direction. In each of the +x direction and −x direction relative to the base portion 60, the sliding ribs 62 are disposed at intervals in the y direction. The sliding ribs 62 have edges 63 that slide on the inner circumferential surface of the cylindrical film 36. The edges 63 of the sliding ribs 62 extend in the circumferential direction of the cylindrical film 36. The edges 63 of the sliding ribs 62 extend continuously from the guide surfaces 61 of the base portion 60 to a side away from the heater unit 40 when seen from the y direction.

The stay 38 is formed of a steel sheet material or the like. A cross-section of the stay 38 perpendicular to the y direction has a U-shape. The stay 38 is mounted in the −z direction of the support member 37 such that a U-shaped opening portion is covered with the base portion 60 of the support member 37. Half of the stay 38 in the +z direction is present between the sliding ribs 62 on both sides of the support member 37 in the x direction. The stay 38 has a length in the y direction. Both end portions of the stay 38 in the y direction are fixed to the housing 10 of the image forming apparatus 1. As a result, the film unit 35 is supported in the image forming apparatus 1. The stay 38 improves the bending stiffness of the film unit 35.

The guide member 39 is formed of a resin material or the like. The guide member 39 is disposed opposite to the heater unit 40 with respect to the support member 37. The guide member 39 includes a base portion 65 and guide ribs 66. The base portion 65 is mounted on half of the stay 38 in the −z direction. The guide ribs 66 protrude from the base portion 65 in the +x direction. Each of the guide ribs 66 has a thickness in the y direction. The guide ribs 66 are disposed at intervals in the y direction. The guide ribs 66 are present at positions different from the sliding ribs 62 of the support member 37 in the y direction. The guide ribs 66 have edges 67 that slide on the inner circumferential surface of the cylindrical film 36. The edges 67 of the guide ribs 66 extend in the circumferential direction of the cylindrical film 36.

As illustrated in FIG. 4, the stoppers 70 are in contact with the end portions of the cylindrical film 36 in the y direction. The stoppers 70 are disposed on both sides in the y direction further than the guide member 39. The stoppers 70 are mounted on the stay 38. The stopper 70 includes an insertion portion 71 and a flange 72. Both sides of the insertion portion 71 in the −z direction and the x direction of the support member 37 and the stay 38 extend continuously in an arc shape. The insertion portion 71 is inserted into an end portion of the cylindrical film 36. An outer circumferential surface of the insertion portion 71 extends in the circumferential direction of the cylindrical film 36. The outer circumferential surface of the insertion portion 71 is in contact with the inner circumferential surface of the cylindrical film 36 over half or more of the circumference. The flange 72 protrudes from an edge of the insertion portion 71 on the outer side in the y direction to both sides in the −z direction and the x direction. The flange 72 can come into contact with the edge of the cylindrical film 36 from the outer side in the y direction. The flange 72 restricts displacement of the cylindrical film 36 in the y direction.

As illustrated in FIG. 3, the thermosensitive elements 54 are disposed in the −z direction of the heater unit 40. The thermosensitive elements 54 come into contact with the surface of the soaking member 80 in the −z direction. The thermosensitive elements 54 are disposed inside a hole that penetrates the support member 37 in the z direction. Wirings of the thermosensitive elements 54 are drawn from the hole of the support member 37 in the −z direction. The thermosensitive elements 54 are a heater thermometer 55 and a thermostat 56. For example, the heater thermometer 55 is a thermistor.

Figure 7:
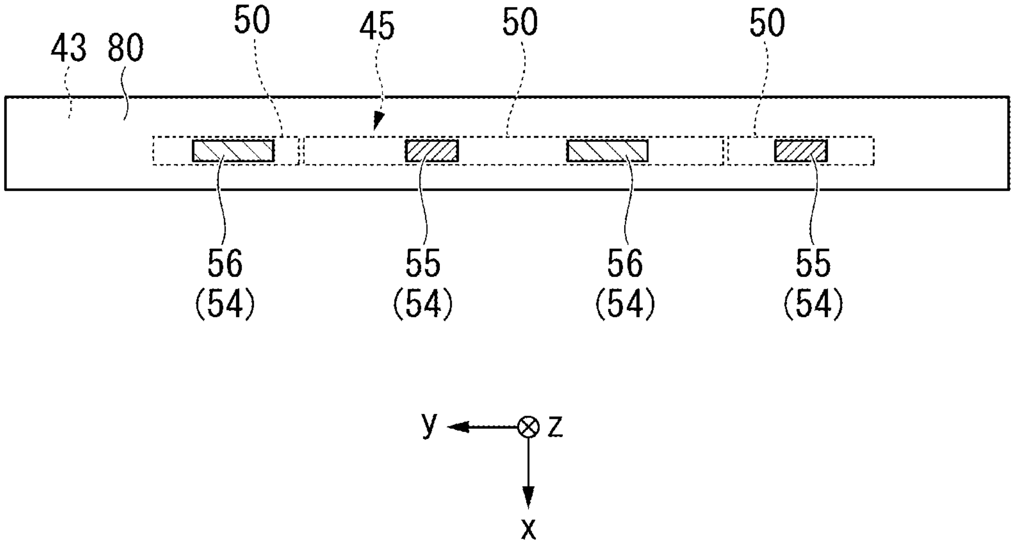
FIG. 7 is a plan view illustrating a heater thermometer and a thermostat.

FIG. 7 is a plan view (view when seen from the −z direction) illustrating the heater thermometers 55 and the thermostats 56. In FIG. 7, the support member 37 is not illustrated. As illustrated in FIG. 7, the heater thermometers 55 are disposed at intervals in the y direction. The thermostats 56 are disposed at intervals in the y direction.

The heater thermometer 55 detects the temperature of the heater unit 40 through the soaking member 80. If the fixing device 30 starts, the control unit 6 (refer to FIG. 1) causes the heater thermometer 55 to measure the temperature of the heat generation unit 45. If the temperature of the heat generation unit 45 is lower than a predetermined temperature, the control unit 6 causes the heat generation unit 45 to generate heat for only a short period of time. Next, the control unit 6 starts rotation of the pressurization roller 31. Due to the heat generation of the heat generation unit 45, the viscosity of the grease applied to the inner circumferential surface of the cylindrical film 36 decreases. As a result, the sliding properties on the heater unit 40 and the cylindrical film 36 at the start of rotation of the pressurization roller 31 are secured.

The heater thermometer 55 detects the temperature of the soaking member 80. If the fixing device 30 operates, the control unit 6 causes the heater thermometer 55 to measure the temperature of the soaking member 80. The control unit 6 controls energization of the heat generation unit 45 based on the temperature measurement result of the soaking member 80. As a result, the temperature of the soaking member 80 in contact with the support member 37 is maintained to be lower than the heat-resistant temperature of the support member 37.

If the temperature of the heater unit 40 detected through the soaking member 80 exceeds a predetermined temperature, the thermostat 56 interrupts energization of the heat generation unit 45. As a result, excessive heating of the cylindrical film 36 by the heater unit 40 is reduced.

As illustrated in FIGS. 3 and 4, the film thermometer 58 is in contact with the inner circumferential surface of a part of the cylindrical film 36. The film thermometers 58 are disposed at intervals in the y direction. The film thermometers 58 detect temperatures of different portions of the cylindrical film 36 in the y direction.

If the fixing device 30 operates, the control unit 6 causes the film thermometer 58 to measure the temperature of each of the portions of the cylindrical film 36 in the y direction. The control unit 6 controls energization of the heat generation unit 45 based on the temperature measurement result of each of the portions of the cylindrical film 36 in they direction.

The support member 37, the guide member 39, the stopper 70, and the film thermometer 58 described above form a contact body 75 that comes into contact with the cylindrical film 36. The contact body 75 is formed such that a contact length with the cylindrical film 36 on a zx cross-section changes depending on positions in the y direction. In the single contact body 75, a distribution in the y direction of the degree of heating to the cylindrical film 36 that rotates during the heating of the heat generation unit 45 is not uniform. The degree of heating to the cylindrical film 36 is a temperature increase rate of the cylindrical film 36. The temperature increase rate is based on the amount of heat transferred from the contact body 75 to the cylindrical film 36.

First Embodiment

Figure 8:
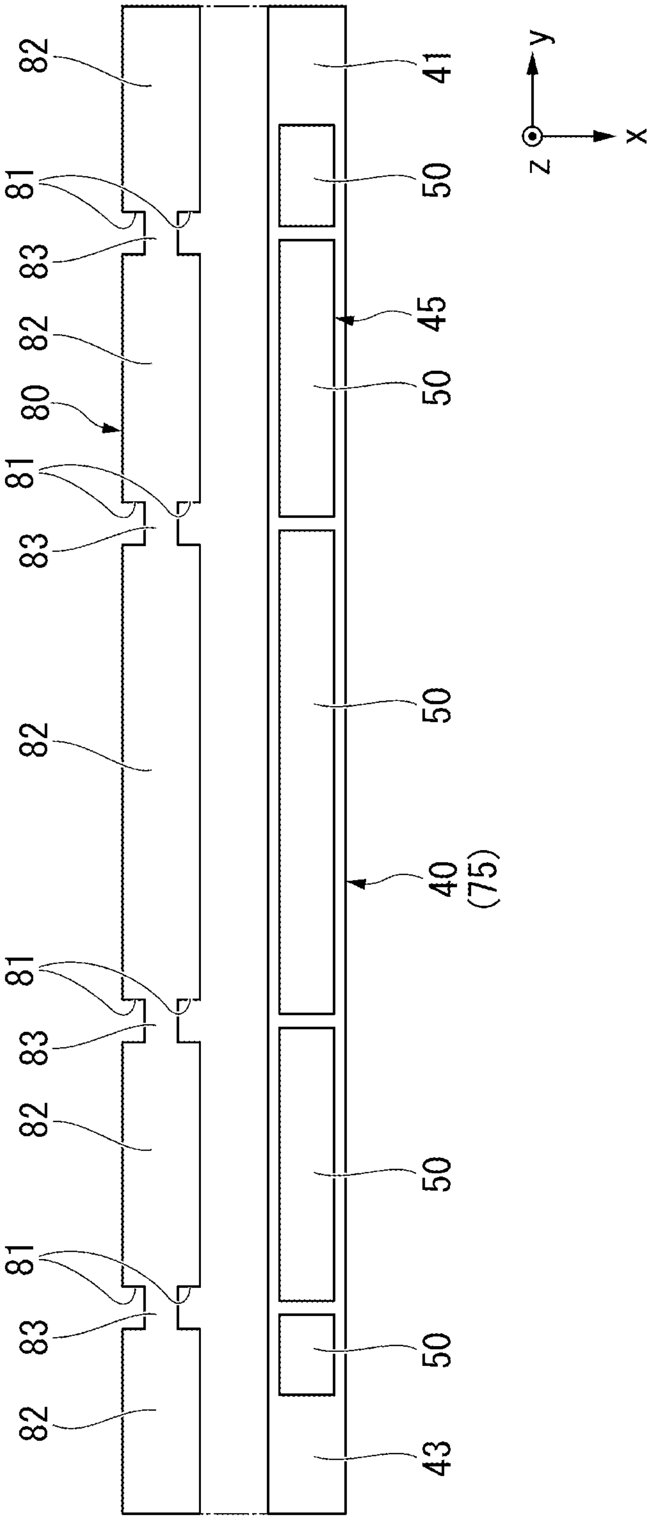
FIG. 8 is a bottom view illustrating a heater unit and a soaking member according to a first embodiment.

The contact body 75 and the soaking member 80 according to a first embodiment will be described in detail. FIG. 8 is a bottom view illustrating the heater unit 40 and the soaking member 80 according to the first embodiment. FIG. 8 illustrates the heater unit 40 and the soaking member 80 that are shifted from each other in the x direction. As illustrated in FIG. 8, the heat generation unit 45 includes a plurality of heating elements 50. In at least one embodiment, the number of the heating elements 50 is five. Each of the heating elements 50 is formed in a rectangular shape in which a pair of sides extend in the y direction and the other pair of sides extend in the x direction. The heating elements 50 have the same size in the y direction. The heating elements 50 are aligned to match each other when seen from the y direction. The entirety of the heat generation unit 45 is formed in a rectangular shape in which the longitudinal direction is the y direction. An interval between a pair of heating elements 50 adjacent to each other extends with a given width in the x direction. In at least one embodiment, a position where the heating element 50 is present in the y direction is defined as a first position. A position of the gap between the heating elements 50 in the y direction is defined as a second position.

The soaking member 80 includes notches 81. The notches 81 are formed on side edges of the soaking member 80 in the x direction. The notches 81 are formed on side edges on both sides in the x direction. The notches 81 are formed to be symmetrical to each other with respect to the width center of the soaking member 80 when seen from the z direction. Each of the notches 81 has openings on both main surfaces of the soaking member 80 in the z direction. Each of the notches 81 has a given width in they direction.

The notches 81 are formed at intervals in the y direction. Each of the notches 81 is present in one formation range (e.g., gap, space, void, etc.) where the interval between the heating elements 50 adjacent to each other in they direction is formed. At least one notch 81 is formed in each of the formation ranges of the intervals between the heating elements 50. In at least one embodiment, since the number of the heating elements 50 is five, four notches 81 are formed on each of the side edges of the soaking member 80. Each of the notches 81 is present in entirety of any one of the formation ranges of the intervals between the heating elements 50. The size of each of the notches 81 on both sides in the y direction is more than the formation range of the interval between the heating elements 50.

Due to the formation of the notches 81, the soaking member 80 includes a first portion 82 and a second portion 83 having different thermal capacities per unit length. The second portion 83 is a portion of the soaking member 80 that matches the formation range of the notch 81 in the y direction. The second portion 83 is at least present at the second position in the y direction. In at least one embodiment, the size of each of the notches 81 on both sides in the y direction is more than the formation range of the interval between the heating elements 50. Therefore, the second portion 83 ranges from the second position to the first position. The first portion 82 is a portion adjacent to the second portion 83. The first portion 82 is a portion of the soaking member 80 that is outside the formation range of the notch 81 in they direction. The first portion 82 is present only at the first position in the y direction.

The size of each of the second portions 83 is less than that of the first portion 82 adjacent thereto in they direction. The size of each of the second portions 83 is less than that of the first portion 82 adjacent thereto in the y direction and comes into contact with the heater unit 40. The thermal capacity of the second portion 83 per unit length in the y direction is lower than the thermal capacity of the first portion 82 per unit length in the y direction. The volume of the second portion 83 per unit length in the y direction is lower than the volume of the first portion 82 per unit length in the y direction. In the zx cross-section of the soaking member 80, the contact length between the second portion 83 and the heater unit 40 is more than the contact length between the first portion 82 and the heater unit 40. The length where the soaking member 80 comes into contact with the second surface 42 of the heater unit 40 at the second position is less than the length where the soaking member 80 comes into contact with the second surface 42 of the heater unit 40 at the first position. The contact area of the second portion 83 with the heater unit 40 per unit length in the y direction is less than the contact area of the first portion 82 with the heater unit 40 per unit length in the y direction.

If the heater unit 40 heats the cylindrical film 36, the contact body 75 absorbs heat from the cylindrical film 36. If the heater unit 40 heats the cylindrical film 36, the contact body 75 is heated at the first position at a first temperature increase rate. If the heater unit 40 heats the cylindrical film 36, the contact body 75 is heated at the second position at a second temperature increase rate. The first temperature increase rate and the second temperature increase rate are values at a given timing during the heating of the heat generation unit 45 and do not need to be constant. The contact body 75 is less likely to be heated at the second position where the heating element 50 is not present than at the first position. Therefore, the second temperature increase rate is lower than the first temperature increase rate. Hereinafter, the temperature increase rate of the contact body 75 or the cylindrical film 36 during the heating of the heat generation unit 45 will also simply referred to as "temperature increase rate".

As described above, in the at least one embodiment, the thermal capacity of the soaking member 80 per unit length at the second position is lower than the thermal capacity of the soaking member 80 per unit length at the first position. With such configuration, the soaking member 80 is less likely to steal heat from the heater unit 40 at the second position than at the first position. The heater unit 40 comes into contact with the soaking member 80 such that the less likeliness of heating of the cylindrical film 36 at the second position than at the first position can be reduced. Therefore, since the temperature increase rate of the contact body 75 at the second position is lower than that at the first position, even when cylindrical film 36 is less likely to be heated at the second position than at the first position, the heater unit 40 can heat the cylindrical film 36 effectively at the second position. Accordingly, the occurrence of temperature unevenness of the cylindrical film 36 in the y direction can be reduced.

The volume of the soaking member 80 per unit length in the y direction at the second position is less than the volume of the soaking member 80 per unit length in the y direction at the first position. With such configuration, the thermal capacity of the soaking member 80 per unit length at the second position is lower than the thermal capacity of the soaking member 80 per unit length at the first position. Accordingly, the fixing device 30 exhibits the above-described effects.

The contact length between the soaking member 80 and the heater unit 40 at the second position is less than the contact length between the soaking member 80 and the heater unit 40 at the first position. With such configuration, the heat transfer area in a contact portion between the soaking member 80 and the heater unit 40 at the second position is less than that at the first position. Therefore, the amount of heat transferred per unit time between the soaking member 80 and the heater unit 40 at the second position is less than the amount of heat transferred at the first position. Accordingly, the soaking member 80 is less likely to steal heat from the heater unit 40 at the second position than at the first position. Accordingly, the fixing device 30 exhibits the above-described effects.

The second portion 83 of the soaking member 80 is shorter than the first portion 82 present at the first position in the y direction and comes into contact with the heater unit 40. With such configuration, the amount of heat transferred per unit time between the second portion 83 of the soaking member 80 and the heater unit 40 is less than the amount of heat transferred per unit time between the first portion 82 and the heater unit 40. Accordingly, the soaking member 80 is less likely to steal heat from the heater unit 40 at the second position than at the first position. Accordingly, the fixing device 30 exhibits the above-described effects.

The heat generation unit 45 includes a plurality of heating elements 50 disposed at intervals in the Y direction. With this configuration, the heater unit 40 is actively heated by the heating elements 50 at the positions where the heating elements 50 are present in the y direction. On the other hand, the heater unit 40 is passively heated by heat transfer from the heating elements 50 in the y direction at the positions where the intervals between the heating elements 50 are present in the y direction. Therefore, if the heater unit 40 that does not come into contact with the soaking member 80 heats the cylindrical film 36, the temperature increase rate of the cylindrical film 36 and the contact body 75 at the position where the interval between the heating elements 50 is present in the y direction is lower than that at the position where the heating element 50 is present. Accordingly, the soaking member 80 can be suitably used.

In at least one embodiment, the size of each of the notches 81 on both sides in they direction is more than the formation range of the interval between the heating elements 50. However, at least one embodiment is not limited to such configuration. Each of the notches may match the formation range where the interval between the heating elements in the y direction is formed. The size of each of the notches on both sides in they direction may be less than the formation range of the interval between the heating elements.

A modification example of the first embodiment will be described. Configurations other than those described below are the same as the first embodiment.

Figure 9:
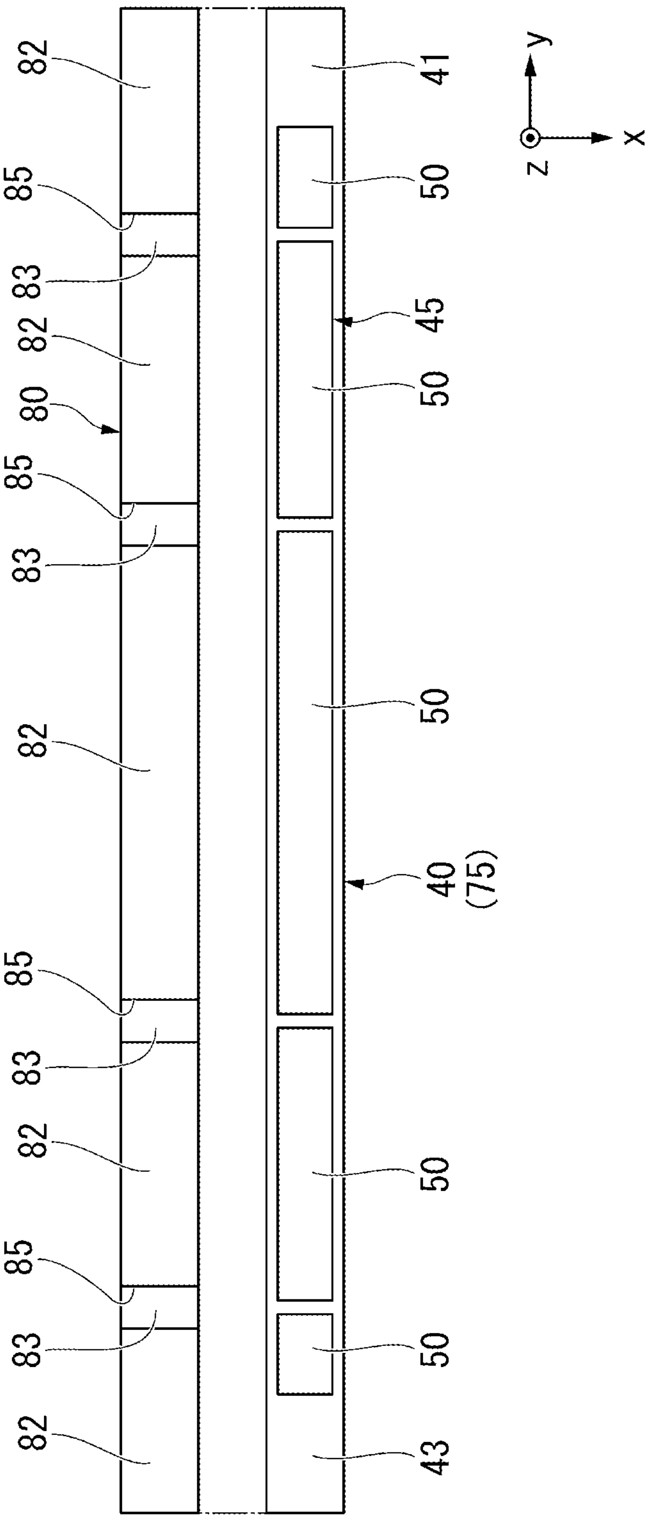
FIG. 9 is a bottom view illustrating a heater unit and a soaking member according to a first modification example of the first embodiment.

FIG. 9 is a bottom view illustrating the heater unit 40 and the soaking member 80 according to a first modification example of the first embodiment. FIG. 9 illustrates the heater unit 40 and the soaking member 80 that are shifted from each other in the x direction. As illustrated in FIG. 9, the soaking member 80 according to the first modification example includes grooves 85 instead of the notches 81 according to the first embodiment. The grooves 85 are formed on a surface of the soaking member 80 facing the +z direction. The grooves 85 have openings toward the second surface 42 of the heater unit 40. The grooves 85 extend in the x direction. Each of the grooves 85 has a given width in the y direction. The grooves 85 have openings on both end surfaces of the soaking member 80 in the x direction. The grooves 85 are formed at intervals in the y direction. Each of the grooves 85 is present in one formation range where the interval between the heating elements 50 adjacent to each other in the y direction is formed. In at least one embodiment, since the number of the heating elements 50 is five, the number of the grooves 85 is four. Each of the grooves 85 is present in entirety of any one of the formation ranges of the intervals between the heating elements 50. The size of each of the grooves 85 on both sides in the y direction is more than the formation range of the interval between the heating elements 50.

Due to the formation of the grooves 85, the soaking member 80 includes the first portion 82 and the second portion 83 having different thermal capacities per unit length. The second portion 83 is a portion of the soaking member 80 that matches the formation range of the groove 85 in the y direction. The second portion 83 is at least present at the second position in the y direction. In at least one embodiment, the size of each of the grooves 85 on both sides in the y direction is more than the formation range of the interval between the heating elements 50. Therefore, the second portion 83 ranges from the second position to the first position. The first portion 82 is a portion adjacent to the second portion 83. The first portion 82 is a portion of the soaking member 80 that is outside the formation range of the groove 85 in the y direction. The first portion 82 is present only at the first position in the y direction.

The size of each of the second portions 83 is less than that of the first portion 82 adjacent thereto in the y direction. The length of each of the second portions 83 is shorter than that of the first portion 82 adjacent thereto in the y direction and comes into contact with the heater unit 40. The thermal capacity of the second portion 83 per unit length in the y direction is lower than the thermal capacity of the first portion 82 per unit length in the y direction. The volume of the second portion 83 per unit length in the y direction is lower than the volume of the first portion 82 per unit length in the y direction. In the zx cross-section of the soaking member 80, the contact length between the second portion 83 and the heater unit 40 is less than the contact length between the first portion 82 and the heater unit 40. The grooves 85 extend in the x direction and have openings on both end surfaces of the soaking member 80. Therefore, the contact length between the second portion 83 and the heater unit 40 in the zx cross-section is 0. The contact area of the second portion 83 with the heater unit 40 per unit length in the y direction is less than the contact area of the first portion 82 with the heater unit 40 per unit length in the y direction.

In the modification example, the thermal capacity of the soaking member 80 per unit length at the second position is lower than the thermal capacity of the soaking member 80 per unit length at the first position. Accordingly, the same effects as those of the first embodiment are exhibited.

The soaking member 80 includes the grooves 85 on the surface facing the heater unit 40 side. Therefore, the above-described effects are exhibited without decreasing the area of the soaking member 80 opposite to the heater unit 40. Accordingly, a decrease in the holding strength of the soaking member 80 by the support member 37 can be reduced.

Figure 10:
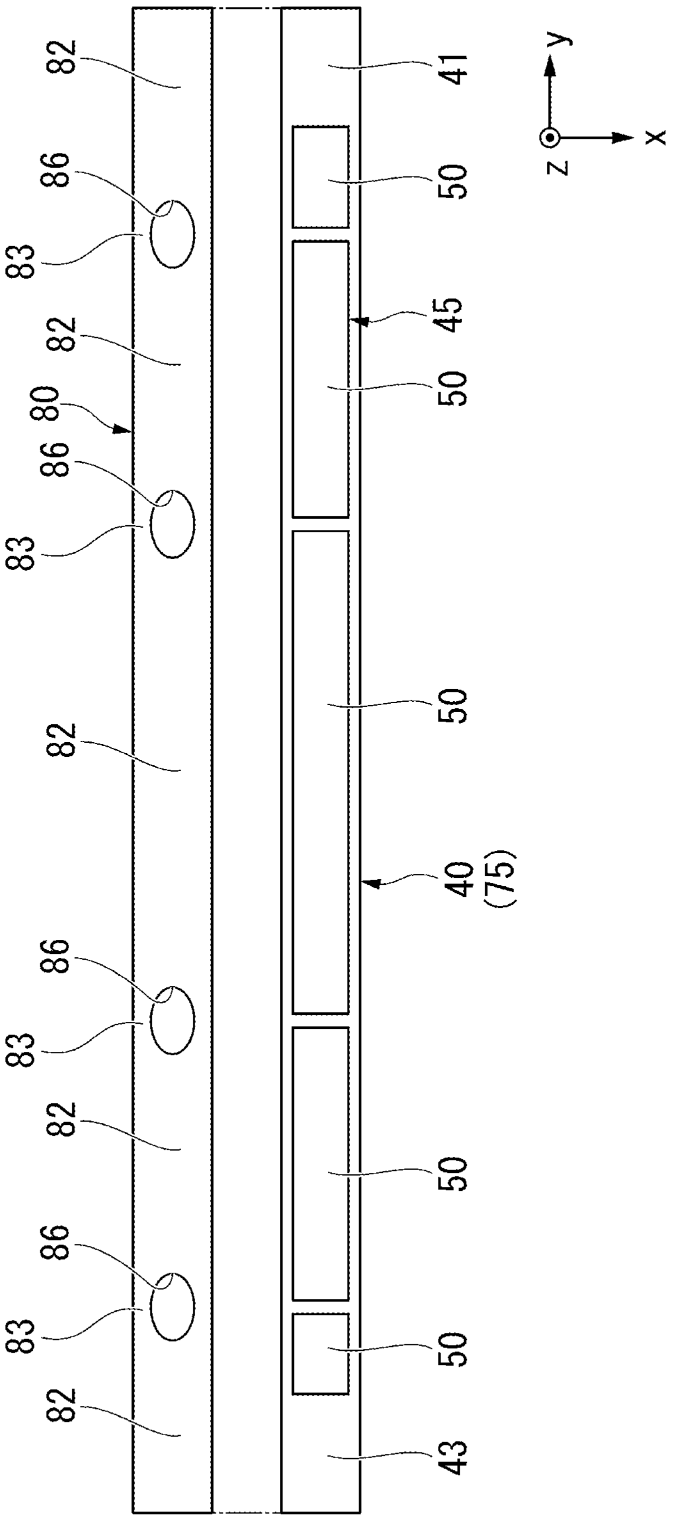
FIG. 10 is a bottom view illustrating a heater unit and a soaking member according to a second modification example of the first embodiment.

FIG. 10 is a bottom view illustrating the heater unit 40 and the soaking member 80 according to a second modification example of the first embodiment. FIG. 10 illustrates the heater unit 40 and the soaking member 80 that are shifted from each other in the x direction. As illustrated in FIG. 10, the soaking member 80 according to the second modification example includes through holes 86 instead of the notches 81 according to the first embodiment. The through holes 86 penetrate the soaking member 80 in the z direction. In the example illustrated in the drawing, the through holes 86 are formed in an elliptical shape in which the long axis direction is the y direction. The through holes 86 are formed at intervals in the y direction. Each of the through holes 86 is present in one formation range where the interval between the heating elements 50 adjacent to each other in the y direction is formed. In at least one embodiment, since the number of the heating elements 50 is five, the number of the through holes 86 is four. Each of the through holes 86 is present in entirety of any one of the formation ranges of the intervals between the heating elements 50 adjacent to each other. The size of each of the through holes 86 on both sides in the y direction is more than the formation range of the interval between the heating elements 50.

Due to the formation of the through holes 86, the soaking member 80 includes the first portion 82 and the second portion 83 having different thermal capacities per unit length. The second portion 83 is a portion of the soaking member 80 that matches the formation range of the through hole 86 in the y direction. The second portion 83 is at least present at the second position in the y direction. In at least one embodiment, the size of each of the through holes 86 on both sides in the y direction is more than the formation range of the interval between the heating elements 50.

Therefore, the second portion 83 ranges from the second position to the first position. The first portion 82 is a portion adjacent to the second portion 83. The first portion 82 is a portion of the soaking member 80 that is outside the formation range of the through hole 86 in the y direction. The first portion 82 is present only at the first position in the y direction.

The size of each of the second portions 83 is less than that of the first portion 82 adjacent thereto in the y direction. The length of each of the second portions 83 is shorter than that of the first portion 82 adjacent thereto in the y direction and comes into contact with the heater unit 40. The thermal capacity of the second portion 83 per unit length in the y direction is lower than the thermal capacity of the first portion 82 per unit length in the y direction. The volume of the second portion 83 per unit length in the y direction is lower than the volume of the first portion 82 per unit length in the y direction. In the zx cross-section of the soaking member 80, the contact length between the second portion 83 and the heater unit 40 is less than the contact length between the first portion 82 and the heater unit 40. The contact area of the second portion 83 with the heater unit 40 per unit length in the y direction is less than the contact area of the first portion 82 with the heater unit 40 per unit length in the y direction.

In the modification example, the thermal capacity of the soaking member 80 per unit length at the first position is lower than the thermal capacity of the soaking member 80 per unit length at the second position. Accordingly, the same effects as those of the first embodiment are exhibited.

Second Embodiment

The contact body 75 and the soaking member 80 according to a second embodiment will be described in detail. In at least one embodiment, the heat generation unit 45 may include a single heating element 50.

Figure 11:
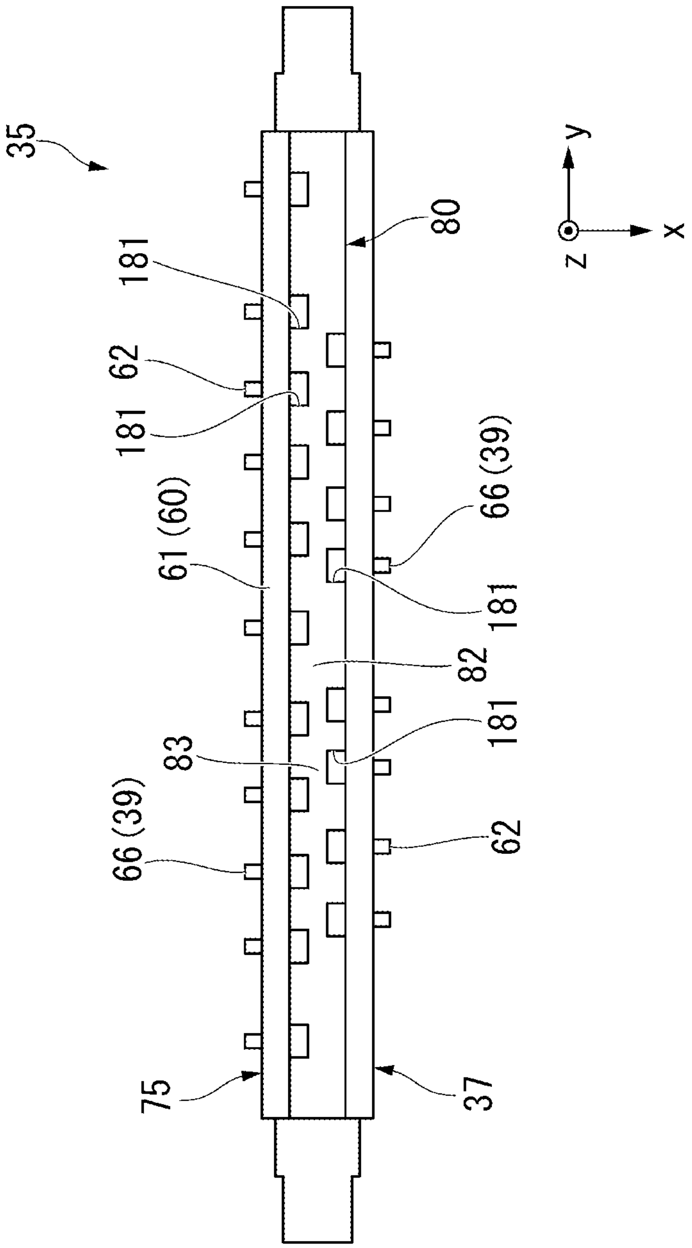
FIG. 11 is a bottom view illustrating a film unit according to a second embodiment.

FIG. 11 is a bottom view illustrating a film unit according to the second embodiment. FIG. 11 does not illustrate the heater unit 40. As illustrated in FIG. 11, in the contact body 75, the sliding ribs 62 of the support member 37 and the guide ribs 66 of the guide member 39 are disposed at intervals in the y direction. Hereinafter, if it is not necessary to distinguish between the sliding ribs 62 and the guide ribs 66, the sliding ribs 62 and the guide ribs 66 will simply referred to as ribs 62 and 66. In at least one embodiment, a position where the ribs 62 and 66 do not come into contact with the cylindrical film 36 in the y direction is defined as a first position. A position where at least one of the ribs 62 and 66 comes into contact with the cylindrical film 36 in the y direction is defined as a second position.

The soaking member 80 includes notches 181 instead of the notches 81 according to the first embodiment. The soaking member 80 according to the second embodiment is different from the soaking member 80 according to the first embodiment in that each of the notches 181 is present in a range where any one of the ribs 62 and 66 in the y direction comes into contact with the cylindrical film 36. Hereinafter, the range where the ribs 62 and 66 come into contact with the cylindrical film 36 will be referred to as "rib contact range". A plurality of rib contact ranges are present at intervals in the y direction. At least one notch 181 is formed in each of the rib contact ranges. Each of the notches 181 is present in entirety of any one of the rib contact ranges in the y direction. The size of each of the notches 181 on both sides in they direction is more than any one of the rib contact ranges in they direction. In each of the rib contact ranges, the notch 181 is formed in a side edge close to the ribs 62 and 66 when seen from the z direction among side edges of the soaking member 80 on both sides in the x direction. Due to the formation of the notches 181, as in the first embodiment, the soaking member 80 includes the first portion 82 and the second portion 83 having different thermal capacities per unit length. In the example illustrated in the drawing, the contact area of the soaking member 80 with the heater unit 40 per unit length in the y direction at least at a part of the second portion 83 is more than that in the first portion 82. However, a relationship between the contact areas of the first portion 82 and the second portion 83 with the heater unit 40 can be appropriately changed depending on the position relationship and the sizes of the ribs 62 and 66.

If the heater unit 40 heats the cylindrical film 36, the contact body 75 is heated at the first position at a first temperature increase rate. If the heater unit 40 heats the cylindrical film 36, the contact body 75 is heated at the second position at a second temperature increase rate. The ribs 62 and 66 come into contact with the cylindrical film 36 and thus absorb heat from the cylindrical film 36 during the heating of the heat generation unit 45. The contact body 75 is more likely to absorb heat from the cylindrical film 36 at the second position where the ribs 62 and 66 are present than at the first position. Therefore, the second temperature increase rate is lower than the first temperature increase rate.

As described above, in at least one embodiment, the thermal capacity of the soaking member 80 per unit length at the second position is lower than the thermal capacity of the soaking member 80 per unit length at the first position. With such configuration, the same effects as those of the first embodiment are exhibited.

The support member 37 includes the sliding ribs 62 disposed at intervals in the y direction and sliding the inner circumferential surface of the cylindrical film 36. The guide member 39 includes the guide ribs 66 disposed at intervals in the y direction and sliding the inner circumferential surface of the cylindrical film 36. The single contact body 75 is more likely to interfere with the heating of the cylindrical film 36 at the position where the ribs 62 and 66 come into contact with the cylindrical film 36 than at the position where the ribs 62 and 66 do not come into contact with the cylindrical film 36. If the heater unit 40 that does not come into contact with the soaking member 80 heats the cylindrical film 36, the temperature increase rate of the cylindrical film 36 at the position where the ribs 62 and 66 come into contact with the cylindrical film 36 is lower than that at the position where the ribs 62 and 66 do not come into contact with the cylindrical film 36. Accordingly, the soaking member 80 can be suitably used.

In at least one embodiment, both of the support member 37 and the guide member 39 include the ribs. However, at least one embodiment is not limited to such configuration. Only one of the support member 37 and the guide member 39 may include ribs sliding on the cylindrical film.

Third Embodiment

The contact body 75 and the soaking member 80 according to a third embodiment will be described in detail. In at least one embodiment, the heat generation unit 45 may include a single heating element 50.

Figure 12:
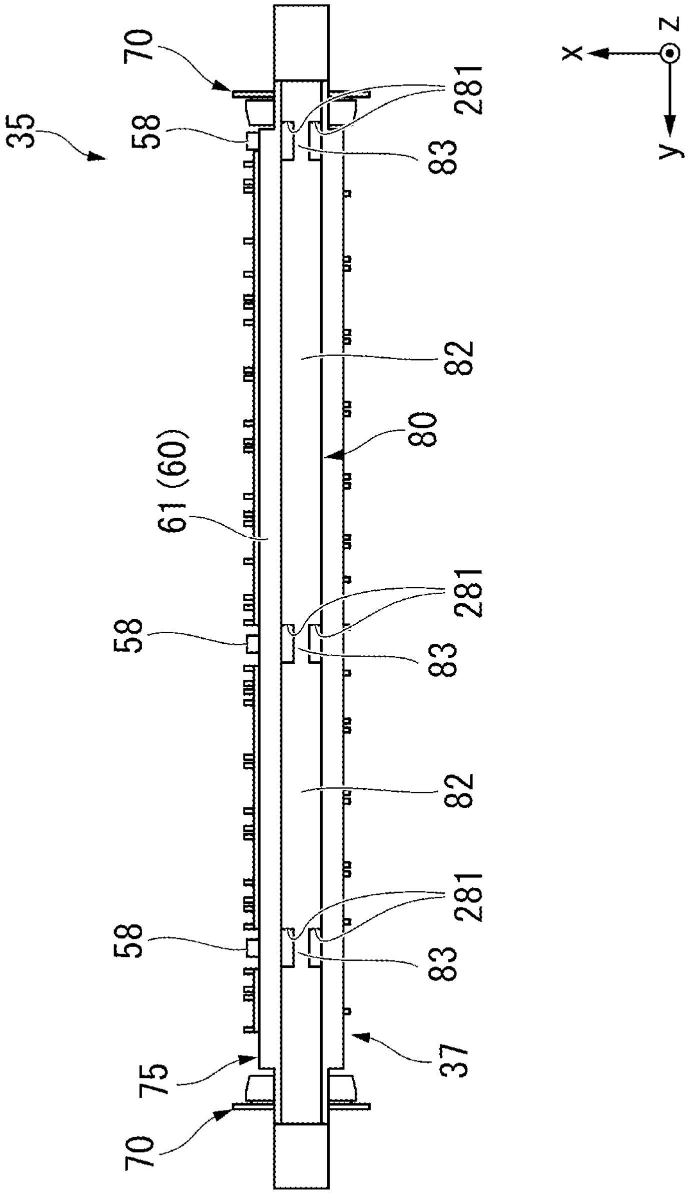
FIG. 12 is a bottom view illustrating a film unit according to a third embodiment.

FIG. 12 is a bottom view illustrating the film unit 35 according to the third embodiment. FIG. 12 does not illustrate the heater unit 40. As illustrated in FIG. 12, in the contact body 75, the film thermometer 58 is present only in a partial range in the y direction. In at least one embodiment, a position where the film thermometer 58 does not come into contact with the cylindrical film 36 in the y direction is defined as a first position. A position where the film thermometer 58 comes into contact with the cylindrical film 36 in the y direction is defined as a second position.

The soaking member 80 includes notches 281 instead of the notches 81 according to the first embodiment. The soaking member 80 according to the third embodiment is different from the soaking member 80 according to the first embodiment in that each of the notches 281 is present in a range where the film thermometer 58 comes into contact with the cylindrical film 36 in the y direction. Due to the formation of the notches 281, as in the first embodiment, the soaking member 80 includes the first portion 82 and the second portion 83 having different thermal capacities per unit length.

If the heater unit 40 heats the cylindrical film 36, the contact body 75 is heated at the first position at the first temperature increase rate. If the heater unit 40 heats the cylindrical film 36, the contact body 75 is heated at the second position. The film thermometer 58 comes into contact with the cylindrical film 36 and thus absorbs heat from the cylindrical film 36 during the heating of the heat generation unit 45. The contact body 75 is more likely to absorb heat from the cylindrical film 36 at the second position where the film thermometer 58 is present than at the first position. Therefore, the second temperature increase rate is lower than the first temperature increase rate.

As described above, in at least one embodiment, the thermal capacity of the soaking member 80 per unit length at the second position is lower than the thermal capacity of the soaking member 80 per unit length at the first position. With such configuration, the same effects as those of the first embodiment are exhibited.

The film thermometer 58 comes into contact with only a part of the cylindrical film 36 in the y direction. The single contact body 75 is more likely to interfere with the heating of the cylindrical film 36 at the position where the film thermometer 58 comes into contact with the cylindrical film 36 than at the position where the film thermometer 58 does not come into contact with the cylindrical film 36. If the heater unit 40 that does not come into contact with the soaking member 80 heats the cylindrical film 36, the temperature increase rate of the cylindrical film 36 at the position where the film thermometer 58 comes into contact with the cylindrical film 36 is lower than that at the position where the film thermometer 58 does not come into contact with the cylindrical film 36. Accordingly, the soaking member 80 can be suitably used.

Fourth Embodiment

The contact body 75 and the soaking member 80 according to a fourth embodiment will be described in detail. In at least one embodiment, the heat generation unit 45 may include a single heating element 50.

Figure 13:
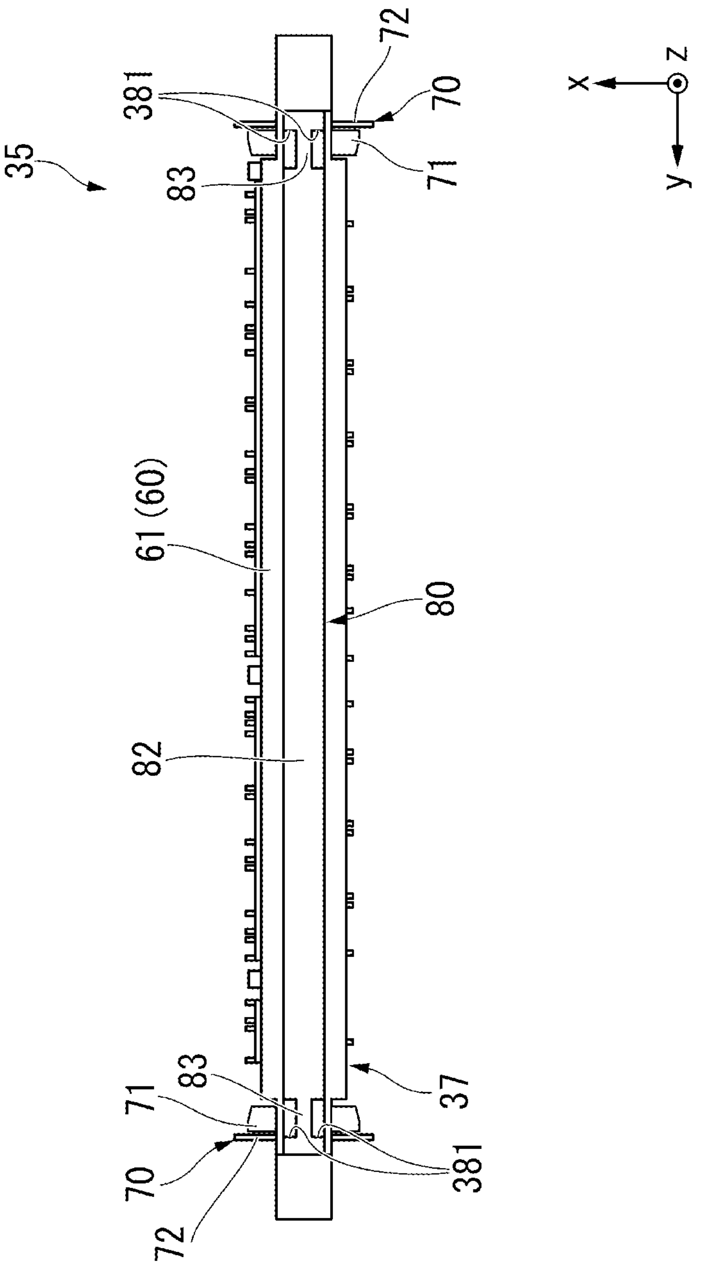
FIG. 13 is a bottom view illustrating a film unit according to a fourth embodiment.

FIG. 13 is a bottom view illustrating the film unit 35 according to the fourth embodiment. FIG. 13 does not illustrate the heater unit 40. As illustrated in FIG. 13, in the contact body 75, the stopper 70 is present only in a partial range in the y direction. In at least one embodiment, a position where the stopper 70 does not come into contact with the cylindrical film 36 in the y direction is defined as a first position. A position where the stopper 70 comes into contact with the cylindrical film 36 in the y direction is defined as a second position.

The soaking member 80 includes notches 381 instead of the notches 81 according to the first embodiment. The soaking member 80 according to the fourth embodiment is different from the soaking member 80 according to the first embodiment in that each of the notches 381 is present in a range where the stopper 70 (the insertion portion 71 thereof) comes into contact with the cylindrical film 36 in the y direction. Due to the formation of the notches 381, as in the first embodiment, the soaking member 80 includes the first portion 82 and the second portion 83 having different thermal capacities per unit length.

If the heater unit 40 heats the cylindrical film 36, the contact body 75 is heated at the first position at a first temperature increase rate. If the heater unit 40 heats the cylindrical film 36, the contact body 75 is heated at the second position at a second temperature increase rate. The stopper 70 comes into contact with the cylindrical film 36 and thus absorbs heat from the cylindrical film 36 during the heating of the heat generation unit 45. The contact body 75 is more likely to absorb heat from the cylindrical film 36 at the second position where the stopper 70 is present than at the first position. Therefore, the second temperature increase rate is lower than the first temperature increase rate.

As described above, in at least one embodiment, the thermal capacity of the soaking member 80 per unit length at the first position is lower than the thermal capacity of the soaking member 80 per unit length at the second position. With such configuration, the same effects as those of the first embodiment are exhibited.

The stopper 70 comes into contact with only an end portion of the cylindrical film 36 in the y direction. The single contact body 75 is more likely to interfere with the heating of the cylindrical film 36 at the position where the stopper 70 comes into contact with the cylindrical film 36 than at the position where the stopper 70 does not come into contact with the cylindrical film 36. If the heater unit 40 that does not come into contact with the soaking member 80 heats the cylindrical film 36, the temperature increase rate of the cylindrical film 36 at the position where the stopper 70 comes into contact with the cylindrical film 36 is lower than that at the position where the stopper 70 does not come into contact with the cylindrical film 36. Accordingly, the soaking member 80 can be suitably used.

Fifth Embodiment

The contact body 75 and the soaking member 80 according to a fifth embodiment will be described in detail. Configurations other than those described below are the same as the first embodiment.

Figure 14:
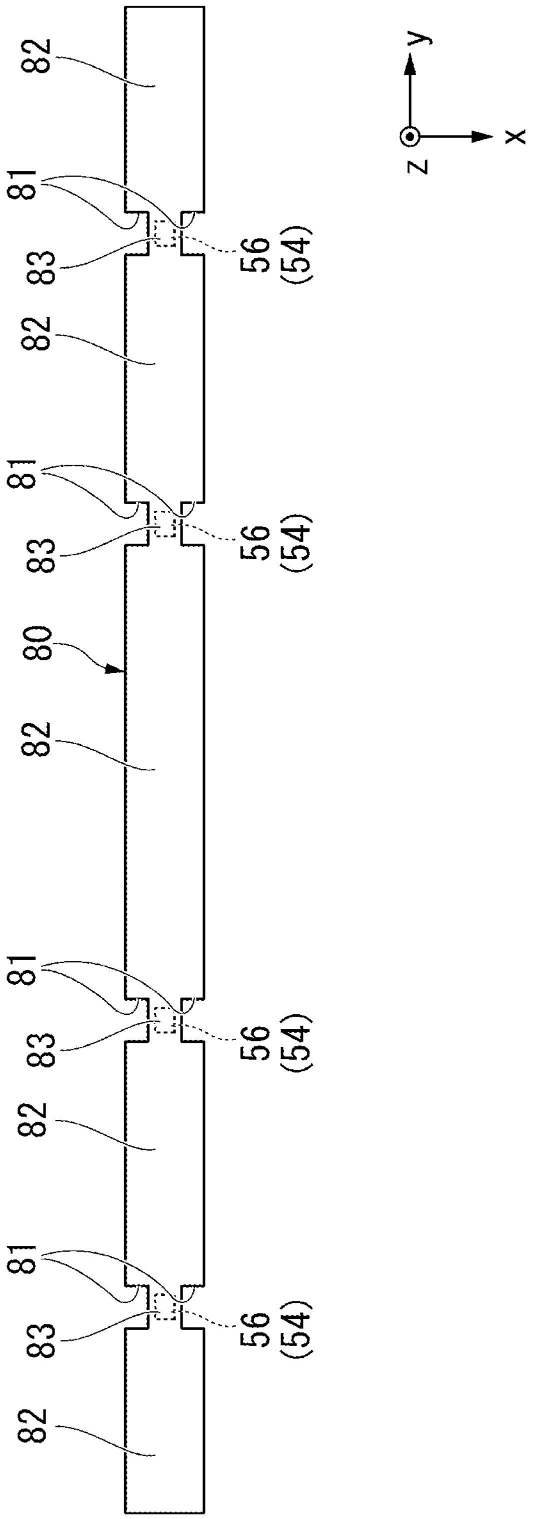
FIG. 14 is a bottom view illustrating a soaking member and thermosensitive elements according to a fifth embodiment.

FIG. 14 is a bottom view illustrating the soaking member 80 and thermosensitive elements 54 according to a fifth embodiment. As illustrated in FIG. 14, the thermosensitive elements 54 come into contact with the second portions 83 of the soaking member 80. The thermosensitive elements 54 come into contact with the soaking member 80 while avoiding the notches 81 such that the contact area with the soaking member 80 does not decrease.

In at least one embodiment, in an assembly including the soaking member 80 and the thermosensitive elements 54, the thermal capacity increases at portions where the thermosensitive elements 54 are provided. In a configuration in which the thermosensitive elements 54 come into contact with the first portions 82, notches or the like need to be newly provided in the first portions 82 in consideration of an increase in thermal capacity caused by providing the thermosensitive elements 54. Here, the size of the notches or the like needs to be designed strictly to prevent a distribution of the thermal capacity of the first portion 82 from being non-uniform. On the other hand, in at least one embodiment, the thermosensitive elements 54 come into contact with the second portions 83. Therefore, by forming the notches 81 to be large in anticipation of an increase in thermal capacity caused by providing the thermosensitive elements 54, the distribution of the thermal capacity can be inhibited from deviating from a desired distribution shape. Accordingly, the soaking member 80 can be easily designed. The thermal capacity where the notches 81 are present may be different from the thermal capacity where the notches 81 are absent.

In at least one embodiment, by forming the notches 81 or the like in the soaking member 80, the second portion 83 having a lower thermal capacity than the first portion 82 is formed. However, at least one embodiment is not limited to such configuration. For example, the first portion and the second portion having different thermal capacities per unit length may be formed by changing the thickness of the soaking member.

In at least one of at least one embodiments described above, if the heater unit 40 heats the cylindrical film 36, the contact body 75 is heated at the first position in the y direction at the first temperature increase rate. If the heater unit 45 heats the cylindrical film 36, the contact body 75 is heated at the second position in the y direction at the second temperature increase rate that is lower than the first temperature increase rate. The thermal capacity of the soaking member 80 per unit length at the second position is lower than the thermal capacity of the soaking member per unit length at the first position. As a result, the occurrence of temperature unevenness of the cylindrical film 36 in the y direction can be reduced.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of at least one embodiments described herein may be made without departing from the spirit of the inventions. The accompanying claims and their equivalents are intended to cover such forms or modifications as would fall within the scope and spirit of the invention.

What is claimed is:

1. A fixing device comprising:

a film-shaped cylinder configured to come into contact with a sheet and to rotate, the sheet moving in a first direction;

a heater having a first surface and an opposing second surface, the heater including a plurality of heating elements extending along a longitudinal direction of the heater that is perpendicular to the first direction with a gap disposed between adjacent heating elements of the plurality of heating elements along the longitudinal direction, the first surface being configured to engage with an inner surface of the film-shaped cylinder;

a contact body configured to engage with the inner surface of the film-shaped cylinder, the contact body configured to be heated (i) at a first position along the longitudinal direction at a first temperature increase rate and (ii) at a second position along the longitudinal direction at a second temperature increase rate that is lower than the first temperature increase rate; and a soaking member positioned to engage with the opposing second surface of the heater, the soaking member including at least two first portions and at least one second portion positioned between the at least two first portions, the at least one second portion aligned with the gap and having a second thermal capacity per unit length along the longitudinal direction that is lower than a first thermal capacity per unit length of the at least two first portions along the longitudinal direction.

2. The fixing device of claim 1, wherein a second volume of the soaking member per unit length at the second position is lower than a first volume of the soaking member per unit length at the first position.

3. The fixing device of claim 1, wherein a second contact length between the soaking member and the heater at the second position is shorter than a first contact length between the soaking member and the heater at the first position.

4. The fixing device of claim 1, wherein the soaking member includes:

a first portion that is present only at the first position, and a second portion that is adjacent to the first portion, is present at least at the second position, has a smaller contact area with the heater per unit length in the longitudinal direction than the first portion, is shorter than the first portion in the longitudinal direction, and comes into contact with the heater.

5. The fixing device of claim 1, wherein the contact body includes a support member configured to support the heater and slide along the inner surface of the film-shaped cylinder, the support member including sliding ribs disposed at intervals along the longitudinal direction.

6. The fixing device of claim 1, wherein the contact body includes:

a support member configured to support the heater; and a guide member disposed opposite to the heater with respect to the support member, the guide member including a plurality of guide ribs disposed at intervals along the longitudinal direction that are configured to slide along the inner surface of the film-shaped cylinder.

7. The fixing device of claim 1, wherein the contact body includes a thermometer positioned to engage with the inner surface of the film-shaped cylinder to detect a temperature of the film-shaped cylinder.

8. The fixing device of claim 1, wherein the contact body includes a thermosensitive element positioned to engage with the soaking member at the second position to detect a temperature of the soaking member, the thermosensitive element including at least one of a thermometer or a thermostat.

9. The fixing device of claim 1, wherein the at least one second portion at least one of (i) includes a groove extending through the soaking member at the second position and having an opening toward the heater, or (ii) includes a through hole extending through the soaking member at the second position and having openings at sides of the soaking member that are perpendicular to the heater, or (iii) defines a notch adjacent the heater at the second position.

10. The fixing device of claim 9, wherein the at least one second portion defines the notch.

11. The fixing device of claim 9, wherein the at least one second portion includes the groove.

12. The fixing device of claim 9, wherein the at least one second portion includes the through hole.

13. The fixing device of claim 1, wherein the gap has a first length along the longitudinal direction and the at least one second portion has a second length along the longitudinal direction, and wherein the second length is greater than the first length.

14. A fixing device comprising:

a film-shaped cylinder;

a heater including a plurality of heating elements extending along a longitudinal direction of the heater with a gap disposed between adjacent heating elements of the plurality of heating elements, a first surface of the heater positioned to engage with an inner surface of the film-shaped cylinder; and a soaking member positioned to engage with an opposing second surface of the heater, the soaking member including a plurality of first portions and a plurality of second portions, a respective one of the plurality of second portions positioned between adjacent first portions of the plurality of first portions, aligned with the gap, and having a second thermal capacity per unit length along the longitudinal direction that is lower than a first thermal capacity per unit length of the adjacent first portions along the longitudinal direction.

15. The fixing device of claim 14, wherein the gap has a first length along the longitudinal direction and the respective one of the plurality of second portions has a second length along the longitudinal direction, and wherein the second length is greater than the first length.

16. The fixing device of claim 14, wherein the respective one of the plurality of second portions includes or defines at least one of a notch, a groove, or a through hole.

17. The fixing device of claim 16, wherein the respective one of the plurality of second portions includes or defines the notch.

18. The fixing device of claim 16, wherein the respective one of the plurality of second portions includes or defines the groove.

19. The fixing device of claim 16, wherein the respective one of the plurality of second portions includes or defines the through hole.

* * * * *